Figure 1:
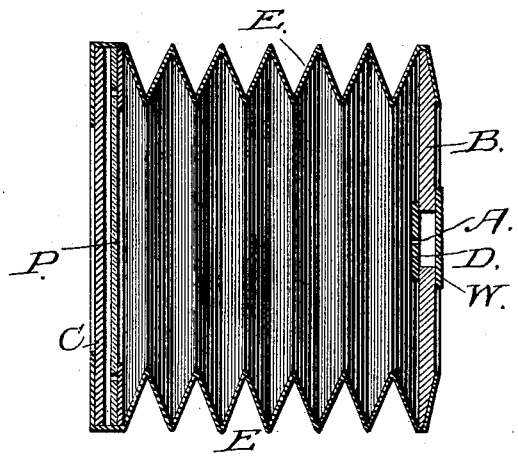
Figure 2:
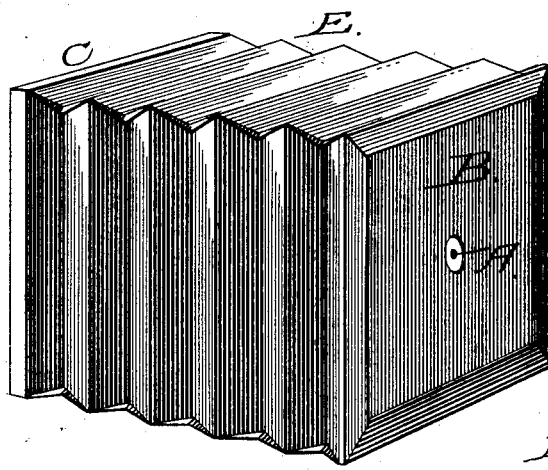
Figure 3:
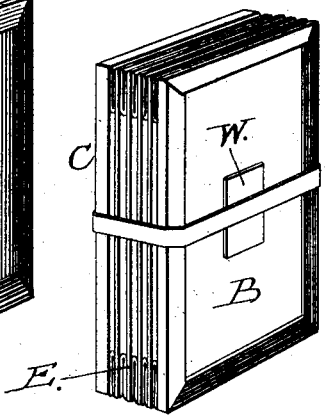

(No Model.)

A. P. WHITTELL.
PHOTOGRAPHIC APPARATUS.

No. 360,499. Patented Apr. 5, 1887.

Witnesses:
Henry H. Hartty
J. H. Gregory

Inventor:
Alexander Pope Whittell

UNITED STATES PATENT OFFICE.

ALEXANDER POPE WHITTELL, OF SAN FRANCISCO, CALIFORNIA.

PHOTOGRAPHIC APPARATUS.

SPECIFICATION forming part of Letters Patent No. 360,499, dated April 5, 1887.

Application filed March 13, 1886. Serial No. 195,097. (No model.)

*To all whom it may concern:*

Be it known that I, ALEXANDER POPE WHITTELL, a citizen of the United States, and a resident of the city and county of San Francisco, State of California, have invented a new and useful Portable Photographic Camera and Sensitized-Plate Apparatus, of which the following is a specification.

My invention relates to improvements in apparatus for taking photographs, by which each sensitized plate has its portable folding camera attached and the use of lenses for focusing the picture is obviated.

The objects of my improvements are to make each sensitized plate a complete photographing camera without adding greatly to the weight or bulk of the plate, and which will be ready for immediate use at all times and places; also, to greatly lessen the cost of portable photographic apparatus for popular use and facilitate their manipulation by the amateur and inexperienced, who may by their use always obtain a good image, as no focusing of the apparatus is required. We attain these objects by the following means, which are illustrated by the accompanying drawings.

In a light-tight folding box, made of paper or other suitable material, a diffraction image is produced upon a sensitized plate by admitting the light, which is reflected from the object or objects being photographed, through a minute aperture in the apparatus, placed at a suitable distance from and opposite to the surface of the plate, the size of the picture being varied by the distance at which the sensitized plate is from the aperture relatively to the distance of the aperture from the objects being photographed, the image, under the varying circumstances, remaining always equally clear and well defined.

Figure I shows a longitudinal cross-section of the complete apparatus, the general appearance and construction of which resembles the ordinary photographic camera, with the sensitized plate in position for receiving an impression, but minus the usual tube and lens, their place being occupied simply by a small thin diaphragm, D, in the front piece, B, having a minute central aperture or perforation, A, of about one-hundredth of an inch in diameter, through which the light is admitted to the sensitized plate P. The stiff back C serves to protect the plate from mechanical injury and excludes the light from the rear. The sensitized plate being permanently fixed, the removal of said plate necessitates the destruction of the entire apparatus. Such being the case, it is readily seen that each apparatus is complete in itself, and can be used but for one operation. The folding portion E, made of suitable flexible material for excluding all light, enables the front part, which carries the visual aperture, before described, to be withdrawn from near the surface of the sensitized plate to the limit of extension of the folding part E, by which means the size of the photographic image is regulated. When not in use, the aperture in the front is covered by an adhesive wafer, W, which serves to exclude the light.

Fig. II shows the apparatus in position for taking a photographic impression, the folding part distended, and the wafer removed from the front or visual aperture.

Fig. III shows the appearance of the apparatus when closed for transportation before and after use.

I claim and desire to secure by Letters Patent—

1. A portable photographic apparatus consisting of a folding, extensible, and light-tight box having a minute aperture made in the front, in combination with a sensitized plate or film within the box opposite the aperture, and permanently fixed, whereby its removal necessitates the destruction of said box, substantially as herein described.

2. A folding extensible light-tight box having a small aperture and a sensitized plate or film permanently fixed within it, so that the removal of the plate necessitates the destruction of said box, in combination with a removable adhesive patch or wafer for covering the opening, substantially as herein described.

ALEXANDER POPE WHITTELL.

Witnesses:
HENRY H. HARTLEY,
JAMES N. GREGORY.